Figure 1:
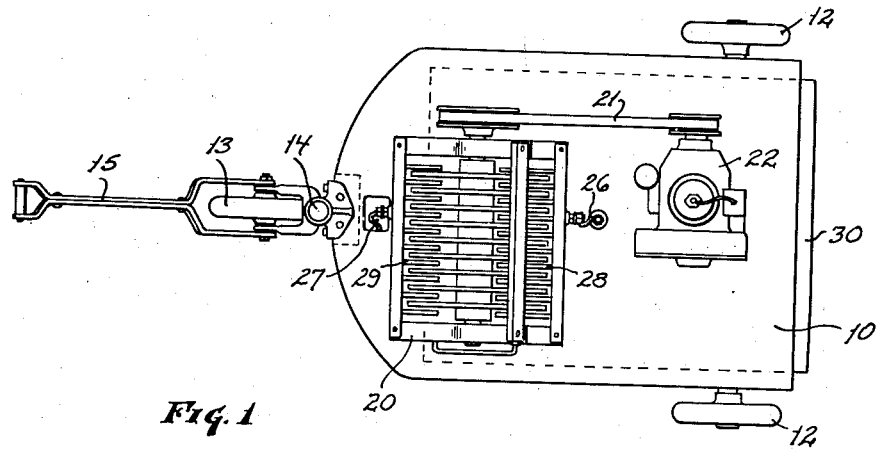

Jan. 20, 1942.   E. KEYSER ET AL   2,270,526
METHOD OF AND APPARATUS FOR RECOVERING PRECIOUS ORES
Filed Dec. 9, 1940

INVENTOR.
Edwin Keyser and Stanley Prusinski,
BY Albert N. Bates,
Attorney.

Patented Jan. 20, 1942

2,270,526

UNITED STATES PATENT OFFICE 2,270,526

METHOD OF AND APPARATUS FOR RECOVERING PRECIOUS ORES

Edwin Keyser and Stanley Prusinski, Cleveland, Ohio, assignors of one-third to Stanton Cooper, New York, N. Y.

Application December 9, 1940, Serial No. 369,280

14 Claims. (Cl. 209—127)

The object of this invention is to provide a method and apparatus for the efficient recovery of particles of precious metal directly from the ground carrying the same near the surface. For instance, in the vicinity of gold mines, it is well-known that the soil contains near the surface, quantities of gold dust constituting such a small percentage as not to be worth working by the ordinary methods but still valuable if they could be cheaply recovered from the surface of the ground.

It has heretofore been proposed to scrape off material near the top of the ground and transport it to a suitable apparatus where it may be spread out in a layer adjacent but out of contact with amalgamated surfaces, and then to charge such soil and the surface with high voltage electricity of opposite signs respectively, thereby causing the electrified particles of gold or other metal to pass to the amalgamated surface for subsequent recovery in the usual manner.

We have found, however, that the gold dust lies very near the surface of the ground and that it is extremely difficult, if not impossible, to scrape up from the ground a layer of earth which will carry the gold dust and at the same time not include so much useless matter as to very seriously interfere with the operation and reduce the efficiency of the recovery.

To avoid the difficulty attendant on such scraping operation, as well as to save the expense of transporting a quantity of useless matter to the apparatus we propose to employ a vehicle which may travel on the metal bearing ground and sustain a plate amalgamated on its underside a short distance above the surface of the ground, and to electrify this plate and the particles of precious metal at the surface to cause them to fly upwardly from the ground to the underside of the amalgamated plate.

In carrying out our proposed operation, a difficulty was encountered in efficiently electrifying the particles of precious metal on the ground while leaving them free to move upwardly, but we have discovered that by providing a metal screen with its wires encased in rubber and attached to one terminal of the electric machine, and dragging such screen over the ground in contact therewith directly below the amalgam plate, we could electrify the metal particles on the ground with electricity of the same sign as the screen and cause them to spring upwardly through the openings of the screen into contact with the downwardly facing amalgamated plate which was connected with the other terminal.

By entirely covering the screen with rubber we prevent actual contact with the ground irrespective of the irregular form of the surface and at the same time bring the metal of the screen sufficiently close to the ground to enable the electrification of the metal particles, while the openings of the screen provide space for the particles to move upwardly.

In supplying the high voltage electricity to the plate and screen we have employed satisfactorily a static machine mounted on the vehicle and driven by a gasoline engine on the vehicle and furnishing static electricity, somewhat commensurate to 100,000 volts, to the amalgam plate and screen, but the proper current might be supplied by a transformer. Our experience indicates that the apparatus will operate as well with silver ore as with gold, and that after the particles reach the amalgam plate they are retained in the amalgam, and all that is necessary when a sufficient amount of precious metal has been thus entrapped is to remove the plate and scrape off the amalgam and then recover the metal from the amalgam in the usual manner.

Figure 2:
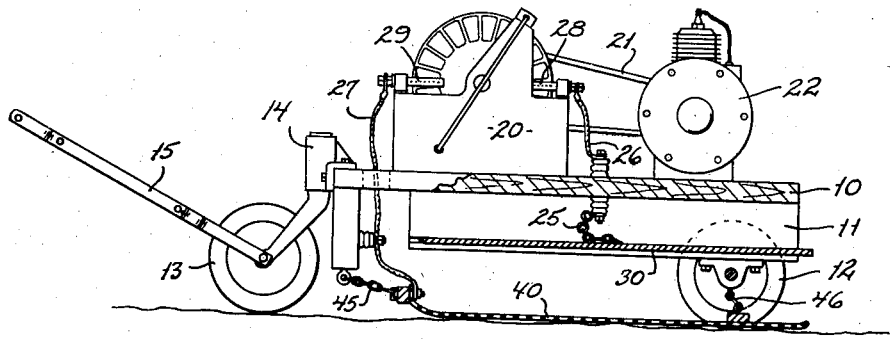
Figure 3:
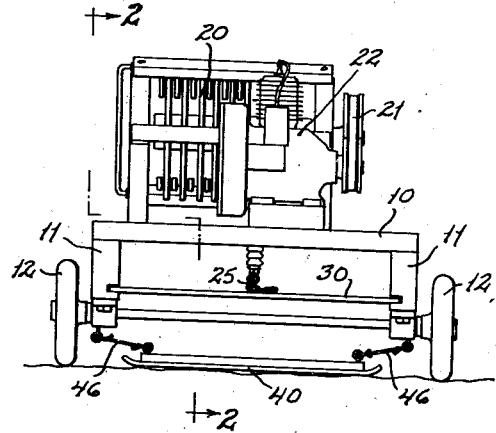
Figure 4:
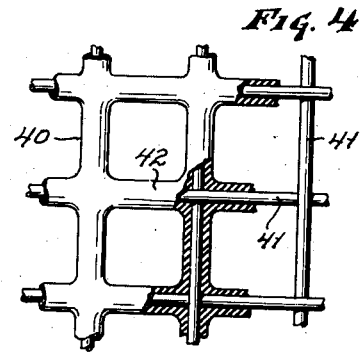

The drawing illustrates one form of our apparatus, Fig. 1 is a plan thereof; Fig. 2 is a sectional side elevation, the plane of the section being indicated by the offset line 2—2 on Fig. 3; Fig. 3 is a rear elevation of the apparatus; Fig. 4 is a plane, partly broken away and on a larger scale, of the screen.

As shown in Figs. 1, 2 and 3, 10 indicates a wooden platform of the vehicle frame and 11 the downwardly extending side sill members thereof, the sill members being shown as carrying two wheels 12 spaced at opposite sides. At the front of the vehicle is shown a wheel 13 mounted in a yoke 14, swiveled to the platform. A suitable tongue 15 provides means for drawing the vehicle over the ground and steering it. In place of such three-wheeled support, two parallel skids might be employed, if desired.

On the platform 10 is shown a static machine 20 driven by a belt 21 from a gasoline engine 22. Of course, other means may be employed for driving the static machine. For instance, it might be geared with one of the wheels of the vehicle through suitable speed-up gears, or, as previously stated a transformer might be employed, in which case the gasoline engine or the gearing could operate a generator to supply current to the transformer.

The amalgam plate, designated 30, may well be a flat copper plate with mercury facing on the underside. This plate is removably mounted in the side sills 11, as for instance, by resting in grooves therein, as shown in Fig. 3. Some suitable electric connection is made from the supply of electricity to the plate. The drawing shows for this purpose a chain 25 resting on the plate and leading through insulated connections 26 to one pole of the static machine. As indicated the plate may be readily removed horizontally from the rear of the machine, whenever desired.

The screen which serves to charge the metal particles on the ground is shown at 40 in Figs. 2 and 3 and in an enlarged view partly broken away in Fig. 4. This screen may be woven of wires 41 or otherwise formed to present a mesh with comparatively extended open spaces, and each metallic member of the screen is encased in rubber 42, which is shown as passing around all of the wires but leaves open spaces, as indicated in Fig. 4.

The screen is insulatingly attached at its forward end to the vehicle, as indicated by the insulated chain 45, and the rear portion may be insulatingly braced from the side sills, as indicated, by the braces 46. The metal of the screen is connected with the other terminal of the static machine or other supply of high voltage electricity, as indicated, by the connection 27. As shown in Fig. 2, the conductor from the amalgam plate 30 goes to one comb 28 of the static machine, while the conductor 27 from the screen goes to the other comb 29. Similar connections would be made if a transformer were used.

We have found that with such machine as above described, and with the amalgam plate located about 10 inches above the ground and static electricity supplied of a voltage in the general nature of 100,000 volts, when the machine is drawn slowly over the ground bearing gold or silver dust, the particles of precious metal at and near the surface are immediately transferred from the ground to the amalgam plate in paying quantities. The device is designed to be very readily handled by one or two men and to be suitable for various surfaces irrespective of much irregularity thereof.

We claim:

1. The method of recovering precious metal particles from the ground comprising propelling over the ground a plate with an amalgam surface on its under face and simultaneously propelling a metallic screen located beneath such plate and close to the ground but out of conductive contact therewith, and oppositely electrifying the amalgam plate and screen.

2. The method of collecting metal particles from the ground comprising propelling over the ground a metal screen very close to the ground but out of metallic contact therewith and at the same time propelling a plate substantially parallel with the ground and located above the screen but out of contact with it, said plate carrying on its under surface means to retain particles of metal, and oppositely electrifying the screen and plate.

3. The method of collecting metallic particles directly from the surface of the ground comprising dragging over such surface and in contact with it a screen of metallic members embraced by insulating material, and at the same time carrying above the screen out of contact with it a substantially horizontal plate carrying mercury on its undersurface, and oppositely electrifying the screen and plate with electricity of the order of 100,000 volts.

4. An apparatus for collecting metal particles directly from the ground, comprising a downwardly facing amalgam plate supported a comparatively short distance above the ground, a metallic member beneath the plate having openings for the passage of particles, means for maintaining said metallic member close to the ground while out of metallic contact therewith, and means for supplying high voltage electricity of opposite sign to the amalgam plate and to said metallic member.

5. An apparatus for collecting metal particles from the ground adjacent the surface thereof comprising a vehicle adapted to rest on the ground and travel over it, a downwardly facing amalgam plate carried by the vehicle, a metallic screen attached to the vehicle beneath the plate, means for maintaining the metallic screen close to the ground while out of metallic contact therewith and means for supplying electricity of opposite sign to the amalgam plate and screen.

6. An apparatus for collecting metallic particles from the ground comprising a vehicle adapted to be moved over the ground, a horizontal metallic plate removably carried by the vehicle and having an amalgam surface on its underside, a metallic screen beneath the plate out of contact therewith, means for supporting such screen very close to the ground but out of metallic contact with it, means on the vehicle for supplying electricity of high voltage, and conductors connecting the opposite terminals of said electric means with the plate and screen respectively.

7. In an apparatus of the character described, the combination of a vehicle, a metallic plate carried thereby and adapted to have an amalgam surface on its underside, a wire screen having its wires covered with insulating material adapted to rest on the ground beneath the amalgam plate, the screen being attached to the vehicle so that it and the plate may be drawn over the ground simultaneously and means on the vehicle for supplying high voltage electricity of the opposite sign to the amalgam plate and screen respectively.

8. An apparatus comprising a vehicle adapted to rest on the ground and be moved over it, a horizontal metallic plate removably carried by the vehicle a short distance above the ground and out of contact with it, said plate having means on its under face for retaining metallic particles, a metallic screen covered with insulating material and attached to the vehicle, said screen being adapted to rest on the ground below the plate and out of contact therewith, means on the vehicle for supplying high voltage electricity, and conductors leading from opposite poles all of said supply to the plate and screen respectively.

9. An apparatus for collecting metallic particles directly from the ground comprising a vehicle adapted to rest on the ground and be moved over it, a horizontal metallic plate removably carried by the vehicle a short distance above the ground and out of contact with it, said plate carrying an amalgam on its under surface, a metallic screen covered with insulating material adapted to rest on the ground below the plate and out of contact therewith while being attached to the vehicle to move with it, a static machine on the vehicle the terminals of which are connected respectively to the plate and screen, and means for rotating the plates of the static machine.

10. The combination of a wheeled vehicle adapted to rest on the ground and be drawn over it, said vehicle having a platform, a static machine and a driving motor therefor on the platform, a horizontal copper plate slidably carried by the vehicle beneath the platform and removable from the rear of the vehicle and having a mercury surface on its underside, a metallic screen covered with insulating material adapted to rest on the ground beneath the amalgam plate, positioning connections between the screen and vehicle so that it will be dragged over the ground as the vehicle travels, and electric conductors connecting the terminals of the static machine with the plate and screen respectively.

11. The method of collecting metal particles directly from the ground in its normal position comprising locating over the ground but out of metallic contact therewith an upper metallic member having on its under surface means for retaining metal particles and a lower metallic member having openings through it, and oppositely electrifying, with comparatively high-voltage electricity, said metallic members to cause metallic particles lying stationary on or embedded in the surface of the ground directly beneath said lower metallic member to rise through said openings to the upper metallic member.

12. The process of collecting metals directly from the surface of the ground comprising locating an amalgamated plate a comparatively short distance above a region of the ground in its natural position, with the amalgamated surface of the plate facing the ground, locating a metallic screen close to the ground, and oppositely electrifying such plate and screen with high voltage electricity to electrify the particles of metal on the ground oppositely to the electrification of the amalgamated surface.

13. The method of recovering precious metal particles directly from the ground comprising moving above a stationary metal-bearing region of the ground a plate with an amalgam surface on its under face, dragging beneath such plate and on the ground but out of conductive contact therewith a metallic member having spaces through which particles may pass, and oppositely electrifying the amalgam plate and said metallic member to a relatively high potential.

14. The process of collecting metals directly from the surface of the ground comprising propelling over the ground a comparatively short distance above it an amalgamated plate, electrifying the plate with electricity of the general order of 100,000 volts of one sign, and, at the same time, electrifying the particles of metal on the ground with opposite sign electricity of a similar order of voltage.

EDWIN KEYSER.
STANLEY PRUSINSKI.